US012095267B1

(12) United States Patent
Yang

(10) Patent No.: US 12,095,267 B1
(45) Date of Patent: Sep. 17, 2024

(54) LOW-CARBON POWER SYSTEM OSCILLATION SUPPRESSION METHOD BASED ON ENERGY STORAGE POWER STATION

(71) Applicant: Changsha University, Changsha (CN)

(72) Inventor: Bo Yang, Changsha (CN)

(73) Assignee: Changsha University, Changsha (CN)

( * ) Notice: Subject to any disclaimer, the term of this patent is extended or adjusted under 35 U.S.C. 154(b) by 0 days.

(21) Appl. No.: 18/617,580

(22) Filed: Mar. 26, 2024

(30) Foreign Application Priority Data

Apr. 14, 2023 (CN) .......................... 202310395420.3

(51) Int. Cl.
*H02J 3/24* (2006.01)
*H02J 3/28* (2006.01)

(52) U.S. Cl.
CPC .................. *H02J 3/24* (2013.01); *H02J 3/28* (2013.01); *H02J 2203/20* (2020.01)

(58) Field of Classification Search
USPC .......................................................... 703/13
See application file for complete search history.

(56) References Cited

U.S. PATENT DOCUMENTS

2017/0346427 A1 * 11/2017 Thet ........................ H02P 9/006
2022/0021211 A1 * 1/2022 Ma ........................ G05B 11/42

FOREIGN PATENT DOCUMENTS

| CN | 104218594 A | 12/2014 | |
|---|---|---|---|
| CN | 109742756 A | 5/2019 | |
| CN | 110518601 A | * 11/2019 | ............... H02J 3/24 |
| CN | 111313435 A | 6/2020 | |
| CN | 111697596 A | 9/2020 | |
| CN | 111864763 A | 10/2020 | |
| CN | 115470736 A | 12/2022 | |
| CN | 116345483 A | * 6/2023 | |

OTHER PUBLICATIONS

Liu_2022 (power oscillation analysis of PMSG wind power generation system considering power control nonlinearity, Jun. 16, 2022 Frontiers in Energy Research). (Year: 2022).*

* cited by examiner

*Primary Examiner* — Brian S Cook

(57) ABSTRACT

The present disclosure provides an oscillation suppression method for a low-carbon power system based on energy storage power stations. Firstly, constructing a power system oscillation suppression model; secondly, constructing a correlation table of the oscillation modes vs the energy storage stations and a correlation table among the damping controller parameters, a delay margin and a damping ratio; thirdly, based on a real time power system oscillation mode, searching for a matching oscillation mode and a oscillation control strategy from the oscillatory control strategy knowledge base that based on the energy storage power stations, and suppressing the power system oscillations based on the oscillation control strategy. Thus providing an effective method to the stable control of the power system, and solving a problem of power system oscillation suppression, which seriously affects the stable operation of the power system, in the coordinated scheduling of source network load storage.

6 Claims, 6 Drawing Sheets oscillation control strategy knowledge base that based on the energy storage power stations correlation table of the oscillation modes vs the energy storage stations

| oscillation modes | energy storage stations |
|---|---|
| ... | ... |
| to be suppressed power system oscillation modes $\lambda$ | the corresponding energy storage stations of the $k'$-th state variable | lines → table correlation table of the damping controller parameters, the delay margin and the damping ratio

| damping controller parameters | delay margin | damping ratio |
|---|---|---|
| ... | ... | ... |
| $(K_c, T_w, T_1, T_2, T_3, T_4)$ | $\tau$ | $\xi_i$ |

$\tau_0$
$\xi_0$ damping performance →

FIG. 4

LOW-CARBON POWER SYSTEM OSCILLATION SUPPRESSION METHOD BASED ON ENERGY STORAGE POWER STATION

CROSS REFERENCE TO RELATED APPLICATIONS

This application claims foreign priority of Chinese Patent Application No. 202310395420.3, filed on Apr. 14, 2023 in the China National Intellectual Property Administration, the disclosures of all of which are hereby incorporated by reference.

TECHNICAL FIELD

The present disclosure relates to a technical field of power system stability control technology, in particular to an oscillation suppression method for a low-carbon power system based on energy storage power stations.

BACKGROUND

Low carbonization of power system is one of key technologies for achieving green and low-carbon energy transformation and development. In order to achieve the goal of carbon peak and carbon neutrality, the national carbon emission rights trading market will take the power generation industry as the first industry to be adopted in the market, and thermal power plants with annual carbon emissions reaching a certain scale will participate in the carbon emission rights trading. That is, with the tightening of carbon quota constraints, the proportion of thermal power with high carbon emissions in the energy supply side of the power system will gradually decrease, and the proportion of wind power and solar power with low-carbon or zero carbon emissions in the energy supply side of the power system will gradually increase.

To ensure the real-time power balance, and to ensure safe and reliable power supply, the strong randomness and high volatility of wind power and solar power generation must be solved by the long-term power balance of energy storage power stations across time scales. Therefore, the pumped storage power station, which is the most mature technology, the best economic performance and the most capable of large-scale development, and electrochemical energy storage power station, which is responded fast, these stations have become important energy storage power of low-carbon power system, and become more and more important in across time scale power balance and low-carbon power system stability control.

Due to the introduction of low-carbon storage in the power system, the stability control mechanism become more complex, low frequency power oscillation risk increased significantly, thus affecting the safety and stable operation of power grid. It needs to research how to maximizing the effectiveness of energy storage power stations in low-carbon power system stability control, which has great significance to ensure the safe and stable operation of the power system, security power system low-carbon goal implementation.

At present, the main role of the power dispatching agency in the energy storage power station is: firstly, peak regulating, to provide new power supply to the power system to meet load demand; secondly, energy consumption cleaning, when the load demand is insufficient, while wind power, solar power generation is full or too full, the energy storage power station changes to the charging mode and stores the excess energy for the power system, to ensure the real-time balance of power and maximum consumption of clean energy. However, the power dispatching agency is in the exploratory stage of how to use the energy storage power station to suppress the low-frequency power oscillation and ensure the safe and stable operation of the large power grid, and there is no effective, mature and standardized method and technical means.

SUMMARY

The present disclosure provides a oscillation suppression method for a low-carbon power system based on energy storage power stations, to suppress the low-frequency power oscillation and ensure the safe and stable operation of the large power grid.

Through constructing a correlation among oscillation modes, energy storage power stations, and damping controller parameters, and by matching the real time power system oscillation mode to the oscillation modes in the oscillation control strategy knowledge base, therefore selecting energy storage power stations strongly related to the to be suppressed power system oscillation modes and the damping controller parameters to suppress the power system oscillations, to make it to meet a predetermined damping performance. The oscillation suppression method for a low-carbon power system based on energy storage power stations provides effective solutions to suppress the power system oscillations, and helps to improve the level of safety and stability control in low-carbon power system.

To realize the above objective, the present disclosure provides an oscillation suppression method for a low-carbon power system based on energy storage power stations, including:

step 1, constructing a power system oscillation suppression model based on an low-carbon power system model with energy storage power stations and a damping controller model;

step 2, according to a participation degree of the state variables in power system oscillation modes of the power system oscillation suppression model, determining energy storage stations strongly related to to be suppressed power system oscillation modes, and constructing a correlation table of the oscillation modes vs the energy storage stations;

step 3, for the energy storage power stations strongly related to the to be suppressed power system oscillation modes, adopting a time-dependent stability condition to construct a correlation table among the damping controller parameters, a delay margin and a damping ratio;

step 4, constructing an oscillatory control strategy knowledge base that based on the energy storage power stations, based on the correlation table of the oscillation modes vs the energy storage stations and the correlation table of the damping controller parameters, the delay margin and the damping ratio;

step 5, based on a real time power system oscillation mode, searching for a matching oscillation mode and a oscillation control strategy from the oscillatory control strategy knowledge base that based on the energy storage power stations;

step 6, suppressing the power system oscillations based on the oscillation control strategy that is matched to the real time power system oscillation mode $\lambda'$.

Compared with the prior art, the beneficial effects of the present disclosure are:

Adopting the energy storage power stations in the power system oscillation suppression model, which conforms with the increasing development trend of energy storage stations in low-carbon power system and provides a third functional of stability controlling, besides that of peak regulating and energy consumption cleaning, and provides technical supports and solutions for the power system oscillation suppression model of the energy storage power stations.

The performance requirements on power system oscillation suppression model of the energy storage power stations include the damping ratio and delay margin, and that of traditional only adopt the damping ratio, thus enlarging the application range, making energy storage power stations can reach a desired requirement in suppressing power system oscillation even if the signals transmission delay exists.

The present disclosure realizes the suppression of the power system oscillation based on the energy storage stations of the low-carbon power system, provides an effective method for better playing the stability control function of the energy storage station, helps to improve the safety and stability control level of the low-carbon power system, and ensures the safe and stable operation of the low-carbon power system.

BRIEF DESCRIPTION OF THE DRAWINGS

FIG. 4 is a diagram of an oscillatory control strategy knowledge base that based on the energy storage power stations of the present disclosure;

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

Further explanations of the present disclosure is provided below in conjunction with embodiments and accompanying drawings.

Figure 1:
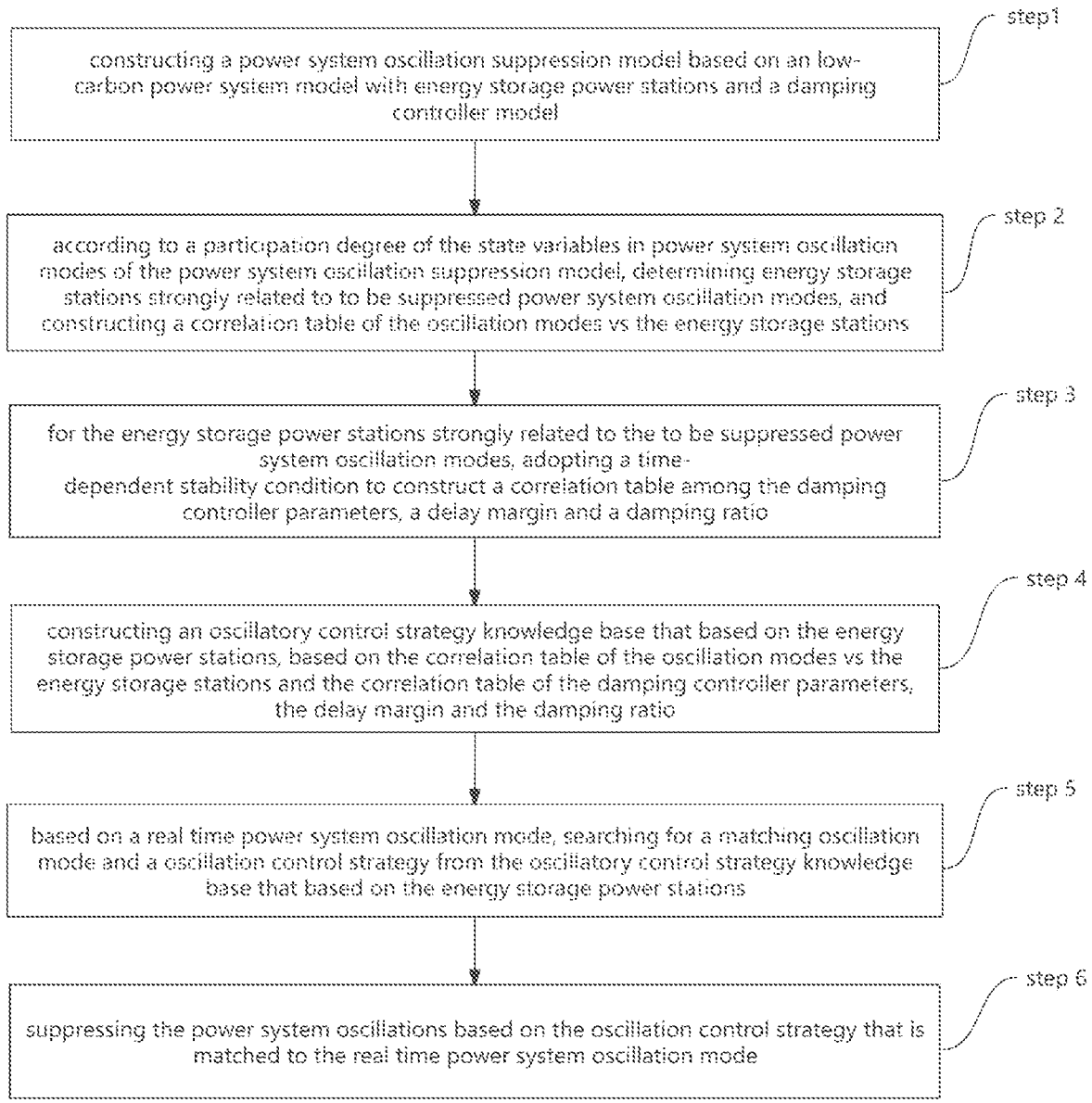
FIG. 1 is a flowchart of an oscillation suppression method for a low-carbon power system based on energy storage power stations of the present disclosure.

FIG. 1 is a flowchart of an oscillation suppression method for a low-carbon power system based on energy storage power stations of the present disclosure, the oscillation suppression method for a low-carbon power system based on energy storage power stations includes:

step 1, constructing a power system oscillation suppression model based on an low-carbon power system model with energy storage power stations and a damping controller model;

step 2, according to a participation degree of the state variables in power system oscillation modes of the power system oscillation suppression model, determining energy storage stations strongly related to to be suppressed power system oscillation modes, and constructing a correlation table of the oscillation modes vs the energy storage stations;

step 3, for the energy storage power stations strongly related to the to be suppressed power system oscillation modes, adopting a time-dependent stability condition to construct a correlation table among the damping controller parameters, a delay margin and a damping ratio;

step 4, constructing an oscillatory control strategy knowledge base that based on the energy storage power stations, based on the correlation table of the oscillation modes vs the energy storage stations and the correlation table of the damping controller parameters, the delay margin and the damping ratio;

step 5, based on a real time power system oscillation mode, searching for a matching oscillation mode and a oscillation control strategy from the oscillatory control strategy knowledge base that based on the energy storage power stations;

step 6, suppressing the power system oscillations based on the oscillation control strategy that is matched to the real time power system oscillation mode λ'.

where, step 1 comprises following steps of:

step 1-1, describing the low-carbon power system model with energy storage power stations as follows:

$$\begin{cases} \dfrac{dx_o(t)}{dt} = f(x_o(t), w_o(t), u_o(t)) \\ 0 = g(x_o(t), w_o(t), u_o(t)) \\ y_o(t) = o(x_o(t), w_o(t), u_o(t)) \end{cases},$$

where, t is time, $x_0(t), w_0(t), u_0(t)$ and $y_0(t)$ are state variables, algebraic variables, input variables and output variables of the low-carbon power system, respectively. Among them, the input variables can be the current, active power, etc. of a certain branch.

In this embodiment, the input variable is the output variable of the damping controller, and the state variable is a quantity that characterizes the state of the power system, such as voltage amplitude, voltage phase angle, frequency, etc; algebraic variables are quantities determined by the power system flow equation.

$dx_0(t)/dt$ is a derivative of the state variables over time t of the low-carbon power system, and $f(x_0(t), w_0(t), u_0(t))$ is a dynamic function relationship of the low-carbon power system, where $f(x_0(t), w_0(t), u_0(t))$ is consisted of dynamic equations of a generator, an exciter, and a governor component in the low-carbon power system, and a generator dynamic equation of the of the low-carbon power system is consisted of a conventional power station generator dynamic equation and an energy storage power stations generator dynamic equation, the dynamic function relationship is described by a system of differential equations, reflecting the temporal variation of state variables; and $g(x_0(t), w_0(t), u_0(t))$ is a algebraic function relation of the low-carbon power system, is composed of an tidal current equation in the low-carbon power system, and $o(x_0(t),w_0(t),u_0(t))$ is an output function relationship of the low-carbon power system, is decided by input signals and output signals of a damping controller;

linearizing the low-carbon power system model with energy storage station at a power system balance point to obtain a linearized low-carbon power system model with energy storage station:

$$\begin{cases} \dfrac{d\Delta x_o(t)}{dt} = A_o \Delta x_o(t) + B_o u_o(t) \\ y_o(t) = C_o \Delta x_o(t) \end{cases},$$

where, $\Delta x_0(t)$ is state variables increments of the low-carbon power system, $A_0$, $B_0$ and $C_0$ are a state matrix, an input matrix and an output matrix of the low-carbon power system, respectively;

In step 1-1, the energy storage power stations generator dynamic equation is a synchronous generator model or a virtual synchronous generator model.

The synchronous generator model can be found in Modern Power System Analysis (Xifan Wang, Wanliang Fang, Zhengchun Du, Science Press, 2011).

In step 1-1, when the energy storage power stations generator dynamic equation is the virtual synchronous generator model:

$$\begin{cases} J_v \dot\omega_v = P_v^* - P_v + D_p(\omega_v - \omega_v^*) \\ K_v \dot E_v = Q_v^* - Q_v + D_q(U_v^* - U_v) \\ \dot\theta_v = \omega_v \end{cases},$$

where, $\omega_v$, $\omega_v^*$, $\dot\omega_v$ are a power grid angle velocity, a reference value of the power grid angle velocity, and a derivative of the power grid angle velocity at an access point of the energy storage power stations, respectively;

$P_v$ and $Q_v$ are an active power and a reactive power of the output of a virtual synchronous generator, respectively, $P_v^*$ and $Q_v^*$ are a reference value of the active power and a reference value of the reactive power reactive power that output by the virtual synchronous generator, respectively; and $J_v$ and $K_v$ are a virtual moment of inertia and a virtual excitation regulation inertia coefficient of the virtual synchronous generator, respectively; $D_p$ and $D_q$ are a damping coefficient and a reactive-voltage droop coefficient of the virtual synchronous generator, respectively; and $U_v$ and $U_v^*$ are a grid voltage and a reference value of grid voltage at the access point of the energy storage power stations; and $E_v$ and $\theta_v$ are an amplitude and a phase of the virtual synchronous generator, respectively; and $\dot E_v$ and $\dot\theta_v$ are a derivative of the amplitude and a derivative of phase of the virtual synchronous generator, respectively.

step 1-2, describing the transfer function model of the damping controller as:

$$y_c(s) = K_c \frac{sT_w}{1+sT_w} \left(\frac{1+sT_1}{1+sT_2}\right)\left(\frac{1+sT_3}{1+sT_4}\right) u_c(s),$$

where, $y_c(s)$ is a Laplace transform value of the output signals of the damping controller, $u_c(s)$ is a Laplace transform value of the input signals of the damping controller, and $K_c$ is a damping controller gain, and $T_w$ is a time constant in a reset process of the damping controller during a process of a reset process, and s is a complex frequency of the Laplace transform, and $T_1, T_2, T_3$ and $T_4$ are the time constants in an advanced stage or a delay stage of the damping controller, respectively;

transforming the transfer function model of the damping controller into a state space form to obtain a state space model of the damping controller:

$$\begin{cases} \dfrac{dx_c(t)}{dt} = A_c x_c(t) + B_c u_c(t) \\ y_c(t) = C_c x_c(t) + D_c u_c(t) \end{cases},$$

where, $x_c(t)$ is state variables of the damping controller, $u_c(t)$ is input variables of the damping controller, and $y_c(t)$ is output variables of the damping controller, and $dx_c(t)/dt$ is derivatives of the state variables of the damping controller over time t, and $A_c, B_c, C_c$ and $D_c$ are a state matrix, an input matrix, an output matrix and a feed forward matrix of the damping controller, respectively;

step 1-3, obtaining a connection model between an input-output of the low-carbon power system with energy storage power stations and an input-output of the damping controller, based on a connection relationship between the low-carbon power system with the energy storage power stations and the damping controller:

$$\begin{cases} u_c(t) = y_o(t - h(t)) \\ u_o(t) = y_c(t) \end{cases},$$

where, h(t) is an output signals transmission delay of the low-carbon power system with the energy storage power stations, and h(t) satisfies an equation of:

$$\begin{cases} h(t) \le \tau \\ \dfrac{dh(t)}{dt} \le \mu \end{cases},$$

where, $\tau$ is a delay margin, where $\tau$ is an upper limit of output signals transmission delay of the low-carbon power system with energy storage power stations, and dh(t)/dt is change rates of the output signals transmission delay of the low-carbon power system with the energy storage power stations, and $\mu$ is an upper limit of the change rates of the output signals transmission delay of the low-carbon power system with the energy storage power stations;

combining the linearized low-carbon power system model with energy storage power stations and the state space model of the damping controller, to obtain the power system oscillation suppression model:

$$\frac{dx(t)}{dt} = Ax(t) + A_d x(t - h(t)),$$

$$x(t) = [\Delta x_o(t) \ x_c(t)]^T,$$

$$A = \begin{bmatrix} A_o & B_o C_c \\ 0 & A_c \end{bmatrix},$$

$$A_d = \begin{bmatrix} B_o D_c C_o & 0 \\ B_c C_o & 0 \end{bmatrix}$$

where, x(t) is state variables of the power system oscillation suppression model, x(t) is consisted of the state variables increments $\Delta x_0(t)$ and the state variables of the damping controller $x_c(t)$, and A is a state matrix of the power system oscillation suppression model, and $A_d$ is a time delay matrix of the power system oscillation suppression model;

step 2, according to a participation degree of the state variables in power system oscillation modes of the power system oscillation suppression model, determining energy storage stations strongly related to to be suppressed power system oscillation modes, and constructing a correlation table of the oscillation modes vs the energy storage stations.

step 2-1, adopting a participation factor matrix to describe the participation degree of the state variables in the power system oscillation modes.

Figure 2:
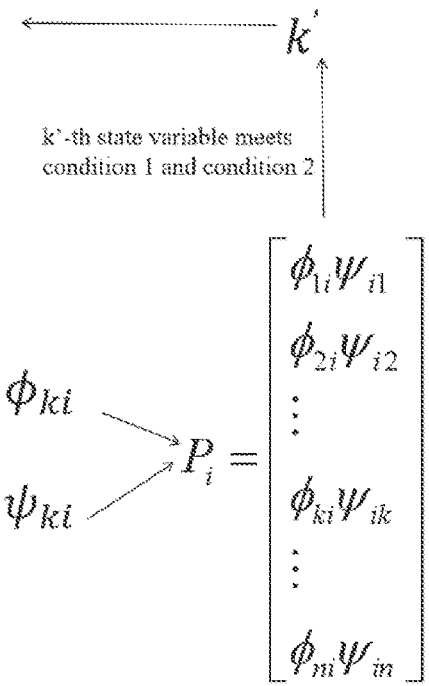
FIG. 2 is a diagram of a correlation table of the oscillation modes vs the energy storage stations of the present disclosure.

FIG. 2 is a diagram of a correlation table of the oscillation modes vs the energy storage stations of the present disclosure. The correlation table of the oscillation modes vs the energy storage stations include two columns of the oscillation modes vs the energy storage stations, where, the column of oscillation modes stores the to be suppressed power system oscillation modes X, and the column of the energy storage stations stores the energy storage stations corresponded to the k'-th state variable.

There are three steps (step 2-1, step 2-2 and step 2-3) to construct the correlation table of the oscillation modes vs the energy storage stations.

step 2-1, adopting a participation factor matrix to describe the participation degree of the state variables in the power system oscillation modes.

describing the participation factor matrix P as follow:

$$P=[P_1, P_2, \ldots P_i, \ldots P_n]$$

where, $P_i$ is a i-th column vector of the factor matrix P:

$$P_i = \begin{bmatrix} \phi_{1i}\psi_{i1} \\ \phi_{2i}\psi_{i2} \\ \vdots \\ \phi_{ki}\psi_{ik} \\ \vdots \\ \phi_{ni}\psi_{in} \end{bmatrix},$$

where, i is an i-th column vector of the state matrix of the oscillation suppression model A and the time delay matrix of the oscillation suppression model $A_d$ (hereinafter matrix $A+A_d$), and n is a number of eigenvalues of the matrix $A+A_d$, and k is a number of the k-th state variables of the state variables of the power system oscillation suppression model, and a value range of k is 1, 2, . . . ,n;

determining $P_i$, and $P_i$ is a i-th column vector of the factor matrix P, by performing a calculation for eigenvalues, right eigenvectors, left eigenvectors of the matrix $A+A_d$;

calculating the i-th right eigenvector $\phi_i$ by a following equation:

$$(A+A_d)\phi_i=\lambda_i\phi_i;$$

where, $\lambda_i$ is a i-th eigenvalue of the matrix $A+A_d$, $\psi_{ik}$ is a contribution degree of the k-th state variable to the i-th eigenvalue of the matrix $A+A_d$, and $\psi_{ik}$ is a k-th element of an i-th left eigenvector of the matrix $A+A_d$;

calculating $\psi_i$ by the following equation:

$$\psi_i(A+A_d)=\psi_i\lambda_i;$$

step 2-2, determining the to be suppressed power system oscillation modes X and the energy storage stations strongly related to the to be suppressed power system oscillation modes $\lambda$ based on $\lambda_i$, $\lambda_i$ is the i-th eigenvalue of the matrix $A+A_d$;

where, $\lambda_i$, the i-th eigenvalue of the matrix $A+A_d$, is a complex number, describing $\lambda_i$ with a complex form:

$$\lambda_i=\sigma_i\pm j\omega_i,$$

where, $\sigma_i\pm j\omega_i$ is a real part, $\omega_i$ is a virtual part, and j is a symbol of the virtual part;

calculating a damping ratio $\xi_i$ of the i-th eigenvalue of the matrix $A+A_d$ as follow:

$$\xi_i = \frac{-\sigma_i}{\sqrt{\sigma_i^2 + \omega_i^2}},$$

if $\sigma_i$ is greater than a given damping factor $\sigma_0$, or $\xi_i$ greater than a given damping ratio $\xi_0$, and oscillation modes corresponding to $\lambda_i$ can be suppressed automatically, and oscillation modes corresponding to $\lambda_i$ is not treated as the to be suppressed power system oscillation modes;

if $\sigma_i$ is less than the given damping factor $\sigma_0$, or $\xi_i$ is less than the given damping ratio $\xi_0$, and oscillation modes corresponding to $\lambda_i$ is treated as the to be suppressed power system oscillation modes $\lambda$;

when a k'-th state variable meets both of the following conditions:

$$\phi_{k'i}\psi_{ik'}=\max\{\phi_{1i}\psi_{i1},\phi_{2i}\psi_{i2}, \ldots ,\phi_{ki}\psi_{ik}, \ldots ,\phi_{ni}\psi_{in}\} \quad \text{condition 1:}$$

condition 2: the k'-th state variable belongs to the state variables of the energy storage power stations, selecting corresponding energy storage power stations of a k'-th state variable as target energy storage power stations to suppress power system oscillations, where $\max\{\phi_{1i}\psi_{i1}, \phi_{2i}\psi_{i2}, \ldots ,\phi_{ki}\psi_{ik}, \ldots ,\phi_{ni}\psi_{in}\}$ is a maximum value function;

step 2-3, constructing a correlation table of the oscillation modes vs the energy storage stations based on a mapping relationship between the oscillation modes and the energy storage power stations;

defining the mapping relationship between the to be suppressed power system oscillation modes and the corresponding energy storage stations of the k'-th state variable as:

mapping 1: the to be suppressed power system oscillation modes $\lambda==\Rightarrow$the corresponding energy storage stations of the k'-th state variable, where, $\Rightarrow$ is a mapping relationship symbol;

obtaining the following elements according to mapping 1:

(the to be suppressed power system oscillation modes $\lambda$, the corresponding energy storage stations of the k'-th state variable), taking (the to be suppressed power system oscillation modes $\lambda$, the corresponding energy storage stations of the k'-th state variable) as a line in the correlation table of the oscillation modes vs the energy storage stations, as the matrix $A+A_d$ has n eigenvalues, for the i-th eigenvalue of the matrix $A+A_d$, when a value of the i is took from 1 to n, thus obtaining the correlation table of the oscillation modes vs the energy storage stations with multiple lines.

Step 3, for the energy storage power stations strongly related to the to be suppressed power system oscillation modes, adopting a time-dependent stability condition to construct a correlation table among the damping controller parameters, a delay margin and a damping ratio.

Figure 3:
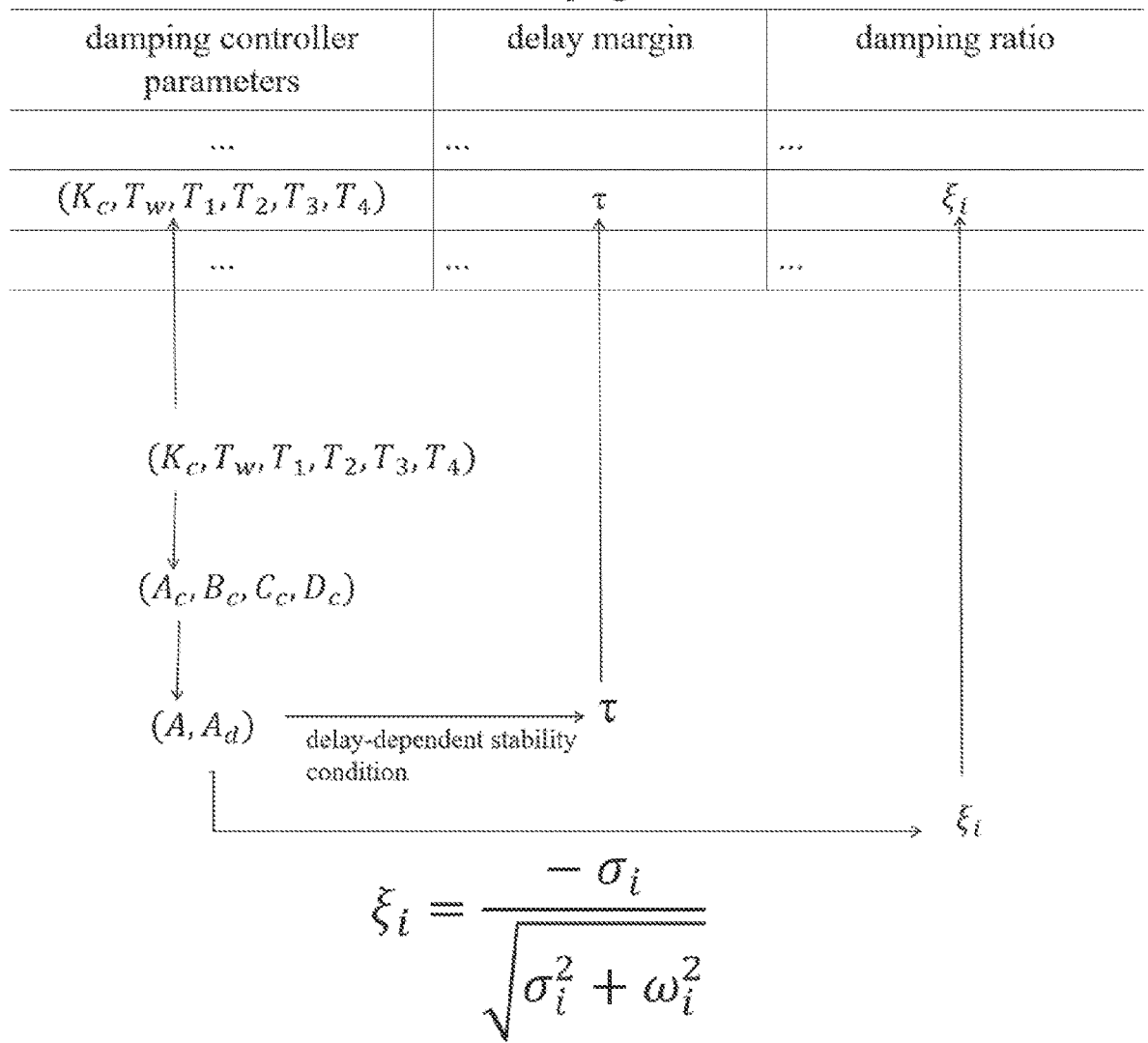
FIG. 3 is a diagram of a correlation table among the damping controller parameters, a delay margin and a damping ratio of the present disclosure.

FIG. 3 is a diagram of a correlation table among the damping controller parameters, a delay margin and a damping ratio of the present disclosure; the correlation table among the damping controller parameters, a delay margin and a damping ratio of the present disclosure includes three columns, where a column of damping controller parameters stores the damping controller parameters ($K_c, T_w, T_1, T_2, T_3, T_4$), a column of delay margin stores the delay margin that corresponds to the damping controller parameters ($K_c, T_w, T_1, T_2, T_3, T_4$), a column of damping ratio stores the damping ratio that corresponds to the damping controller parameters ($K_c, T_w, T_1, T_2, T_3, T_4$).

There are three steps (step 3-1, step 3-2 and step 3-3) to construct the correlation table of damping controller parameters, the delay margin and the damping ratio:

step 3-1, adopting the time delay-dependent stability condition to calculate the delay margin i, and calculating the damping ratio $\xi_i$ according to the matrix $A+A_d$, based on the power system oscillation suppression model $dx(t)/dt = Ax(t) + A_d x(t-h(t))$.

Where, the time-dependent stability conditions are as follows:

giving the delay margin $\tau$ and the upper limit of the change rates of the output signals transmission delay of the low-carbon power system $\mu$, if undecided matrices $M_i = M_i^T > 0$, $M_2 = M_2^T > 0$, $M_3 = M_3^T > 0$, $M = [M_{11}\ M_{12}\ m_{12}^T M_{22}] \geq 0$ and appropriate dimensional matrices $N_1$ and $N_2$ existed to make the following linear matrix inequalities hold:

$$\begin{bmatrix} M_{11} & M_{12} & N_1 \\ M_{12}^T & M_{22} & N_2 \\ N_1^T & N_2^T & M_3 \end{bmatrix} \geq 0, \begin{bmatrix} \Gamma_{11} & \Gamma_{12} & \tau A^T M_3 \\ \Gamma_{12}^T & \Gamma_{22} & \tau A_d^T M_3 \\ \tau M_3^T A & \tau M_3^T A_d & -\tau M_3 \end{bmatrix} < 0,$$

where, $\Gamma_{11} = M_1 A + A^T M_1 + N_1 + N_1^T + M_2 + \tau M_{11}$, $\Gamma_{12} = M_1 A_d - N_1 + N_2^T + \tau M_{12}$, $\Gamma_{22} = -N_2 - N_2^T - (1-\mu) M_2 + \tau M_{22}$, thus, determining the power system oscillation suppression model $dx(t)/dt = Ax(t) + A_d x(t-h(t))$ in a stable state.

as the state matrix A and the time delay matrix $A_d$ of the power system oscillation suppression model are varied over the state matrix $A_c$, input matrix $B_c$, output matrix $C_c$, and feed forward matrix $D_c$ of the damping controller, and a result of the delay margin $\tau$ is corresponded to damping controller parameters ($K_c, T_w, T_1, T_2, T_3, T_4$), and the damping ratio that calculated by the matrix A+ is corresponded to the damping controller parameters ($K_c, T_w, T_1, T_2, T_3, T_4$).

Where, $M_1$, $M_2$, $M_3$ and $M_4$ are undecided matrices. If undecided matrices of $M_1$, $M_2$, $M_3$ and $M_4$ exist, and appropriate dimensional matrices $N_1$ and $N_2$ exist, and the power system oscillation suppression model is in stable state; otherwise, the power system oscillation suppression model is in unstable state.

step 3-2, constructing the mapping relationship among the damping controller parameters, the delay margin and the damping ratio;

defining a mapping relationship of mapping 2 among the damping controller parameters, the delay margin $\tau$ and the damping ratio $\xi_i$ as:

mapping_2: $(K_c, T_w, T_1, T_2, T_3, T_4) \Rightarrow (\tau, \xi_i)$, taking ($K_c, T_w, T_1, T_2, T_3, T_4, \tau, \xi_i$) as a line in the correlation table of the damping controller parameters, the delay margin and the damping ratio;

step 3-3, constructing a correlation table of the damping controller parameters, the delay margin and the damping ratio based on the mapping relationship among the damping controller parameters, the delay margin and the damping ratio;

adjusting the values of the damping controller parameters ($K_c, T_w, T_1, T_2, T_3, T_4$), to obtain the transfer function model of the damping controller and the state space model of the damping controller which are corresponded to the values of the damping controller parameters ($K_c, T_w, T_1, T_2, T_3, T_4$), and;

to obtain the values of $A_c, B_c, C_c$ and $D_c$ which are corresponded to the state space model of the damping controller, and to obtain the state matrix A and time delay matrix $A_d$ which are corresponded to the values of the damping controller parameters ($K_c, T_w, T_1, T_2, T_3, T_4$), and adopting a time delay-dependent stability condition and a formula of the damping ratio to obtain the delay margin $\tau$ and the damping ratio $\xi_i$ based on the state matrix A and time delay matrix $A_d$;

where, the delay margin $\xi_i$ and the damping ratio (are corresponded to the values of the damping controller parameters ($K_c, T_w, T_1, T_2, T_3, T_4$), respectively, describing a derivation and a calculation process as follows:

$(K_c, T_w, T_1, T_2, T_3, T_4) \rightarrow (A_c, B_c, C_c, D_c) \rightarrow (A, A^d) \rightarrow (\xi, \xi_i)$, where, $\rightarrow$ is a derivation symbol;

obtaining multiple mapping 2 elements ($K_c, T_w, T_1, T_2, T_3, T_4, \tau, \xi_i$), when there are multiple values of the damping controller parameters ($K_c, T_w, T_1, T_2, T_3, T_4$);

adopting the multiple mapping 2 elements as multiple lines in the correlation table of the damping controller parameters, the delay margin and the damping ratio, and forming the correlation table of the damping controller parameters, the delay margin and the damping ratio;

step 4, constructing an oscillatory control strategy knowledge base that based on the energy storage power stations, based on the correlation table of the oscillation modes vs the energy storage stations and the correlation table of the damping controller parameters, the delay margin and the damping ratio;

FIG. 4 is a diagram of an oscillatory control strategy knowledge base that based on the energy storage power stations of the present disclosure.

The oscillatory control strategy knowledge base that based on the energy storage power stations is consisted of two parts, one part is the correlation table of the oscillation modes vs the energy storage stations, and another part is the correlation table of the damping controller parameters, the delay margin and the damping ratio. One line of the correlation table of the oscillation modes vs the energy storage stations corresponds to the whole of the correlation table of the damping controller parameters, the delay margin and the damping ratio. There is only one correlation table of the oscillation modes vs the energy storage stations, as there are multiple lines in the correlation table of the oscillation modes vs the energy storage stations, so there are multiple correlation tables of the oscillation modes vs the energy storage stations in the oscillatory control strategy knowledge base. That is, the relationship between the correlation table of the oscillation modes vs the energy storage stations and the correlation table of the damping controller parameters, the delay margin and the damping ratio two is one and many.

Figure 5:
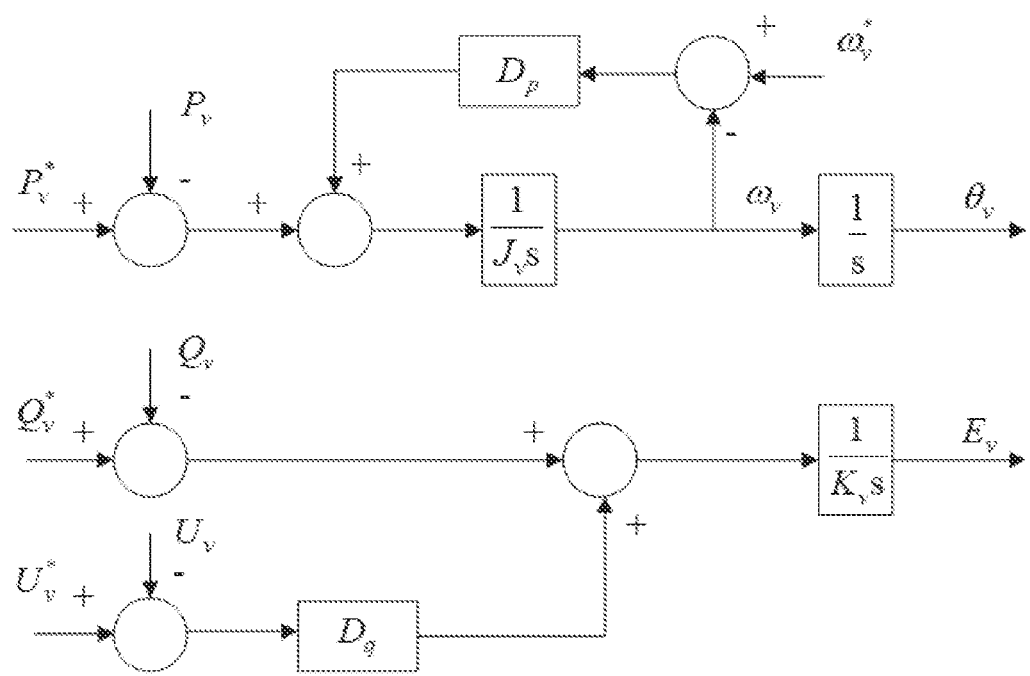
FIG. 5 is a diagram of a virtual synchronous generator model of the present disclosure.

A searching process of the oscillatory control strategy knowledge base that based on the energy storage power stations is as follows:

giving the to be suppressed power system oscillation modes λ;

obtaining the energy storage power stations strongly related to the to be suppressed power system oscillation modes based on correlation table of the oscillation modes vs the energy storage stations, that is, the energy storage power stations strongly related to the to be suppressed power system oscillation modes are the corresponding energy storage stations of the k'-th state variable;

obtaining the damping controller parameters ($K_c, T_w, T_1, T_2, T_3, T_4$) that are corresponded to the delay margin τ and the damping ratio $\xi_i$ based on the correlation table of the damping controller parameters, the delay margin and the damping ratio;

where, the damping controller parameters ($K_c, T_w, T_1, T_2, T_3, T_4$) are met the damping performance requirements of the delay margin τ and the damping ratio $\xi_i$.

step 5, based on a real time power system oscillation mode, searching for a matching oscillation mode and a oscillation control strategy from the oscillatory control strategy knowledge base that based on the energy storage power stations;

step 5-1, in the oscillation control strategy knowledge base that based on the energy storage power stations, comparing the real time power system oscillation mode λ' with the to be suppressed power system oscillation modes λ, and if, $$\lambda' \in \eta(\lambda, \rho);$$

determining the real time power system oscillation mode λ' needs to be suppressed, where η(λ,ρ) is a circular neighborhood with a center λ and a radius ρ;

step 5-2, in the oscillation control strategy knowledge base that based on the energy storage power stations, according to the to be suppressed power system oscillation modes λ,obtaining the energy storage power stations strongly related to the to be suppressed power system oscillation modes λ, based on correlation table of the oscillation modes vs the energy storage stations, that is, to obtain the corresponding energy storage power stations of the k'-th state variable.

step 5-3, in the oscillation control strategy knowledge base that based on the energy storage power stations, with the corresponding energy storage power stations of the k'-th state variable and the correlation table of the damping controller parameters, the delay margin and the damping ratio, determining the damping controller parameters ($K_c, T_w, T_1, T_2, T_3, T_4$) by following solutions:

solution 1: if only a given delay margin $\tau_0$ is set, selecting the damping controller parameters which are corresponded to the delay margin τ as damping controller parameters ($K_c, T_w, T_1, T_2, T_3, T_4$) to be set, where the delay margin τ is greater than the given delay margin $\tau_0$;

under a condition of solution 1, once the damping controller to be set adopts the damping controller parameters ($K_c, T_w, T_1, T_2, T_3, T_4$), the low-carbon power system can remain stable even if the input signals transmission delay of the damping controller is less than or equal to the given delay margin $\tau_0$; and solution 2: if only a given damping ratio $\xi_0$ is set, selecting the damping controller parameters ($K_c, T_w, T_1, T_2, T_3, T_4$) which are corresponded to the damping ratio $\xi_i$ as a damping controller parameters to be set, and the damping ratio $\xi_i$ is greater than the given damping ratio $\xi_0$;

under a condition of solution 2, once the damping controller to be set adopts the damping controller parameters ($K_c, T_w, T_1, T_2, T_3, T_4$), the low-carbon power system can remain stable even if the damping ratio is greater than or equal to the given damping ratio $\xi_0$; and solution 3: if the given delay margin $\tau_0$ and the given damping ratio $\xi_0$ are set, selecting the damping controller parameters ($K_c, T_w, T_1, T_2, T_3, T_4$) which are corresponded to the delay margin τ and the damping ratio $\xi_i$ as a damping controller parameters to be set, where the delay margin τ is greater than the given delay margin $\tau_0$ and the damping ratio $\xi_i$ is greater than the given damping ratio $\xi_0$;

under a condition of solution 3, once the damping controller to be set adopts the damping controller parameters ($K_c, T_w, T_1, T_2, T_3, T_4$), the low-carbon power system can remain stable even if the damping ratio $\xi_i$ is greater than or equal to the given damping ratio $\xi_0$, and the low-carbon power system can still remain stable even if the input signals transmission delay of the damping controller is less than or equal to the given delay margin $\tau_0$;

searching in the oscillation control strategy knowledge base that based on the energy storage power stations, to obtain the energy storage power stations strongly related to the to be suppressed power system oscillation modes land the damping controller parameters ($K_c, T_w, T_1, T_2, T_3, T_4$), and to obtain a oscillation control strategy that is matched to the real time power system oscillation mode λ', and the oscillation control strategy is a decision basis for the power dispatching mechanism to suppress the power system oscillations;

FIG. 5 is a diagram of a virtual synchronous generator model of the present disclosure.

Describing the virtual synchronous generator model as follow:

$$\begin{cases} J_v \dot{\omega}_v = P_v^* - P_v + D_p(\omega_v - \omega_v^*) \\ K_v \dot{E}_v = Q_v^* - Q_v + D_q(U_v^* - U_v), \\ \dot{\theta}_v = \omega_v \end{cases}$$

where, $\omega_v$, $\omega_v^*$ and $\dot{\omega}_v$ are a power grid angle velocity, a reference value of the power grid angle velocity, and a derivative of the power grid angle velocity at an access point of the energy storage power stations, respectively;

$P_v$ and $Q_v$ are an active power and a reactive power of the output of a virtual synchronous generator, respectively, $P_v^*$ and $Q_v^*$ are a reference value of the active power and a reference value of the reactive power reactive power that output by the virtual synchronous generator, respectively; and $J_v$ and $K_v$ are a virtual moment of inertia and a virtual excitation regulation inertia coefficient of the virtual synchronous generator, respectively; $D_P$ and $D_q$ are a damping coefficient and a reactive-voltage droop coefficient of the virtual synchronous generator, respectively; and $U_v$ and $U_v^*$ are a grid voltage and a reference value of grid voltage at the access point of the energy storage power stations; and $E_v$ and $\theta_v$ are an amplitude and a phase of the virtual synchronous generator, respectively; and $\dot{E}_v$ and $\dot{\theta}_v$ are a derivative of the amplitude and a derivative of phase of the virtual synchronous generator, respectively.

step 6, suppressing the power system oscillations based on the oscillation control strategy that is matched to the real time power system oscillation mode λ'; and obtaining the energy storage power stations strongly related to the to be suppressed power system oscillation modes and the damping controller parameters ($K_c, T_w, T_1$, $T_2,T_3,T_4$) based on the oscillation control strategy that is matched to the real time power system oscillation mode $\lambda'$; and updating current damping controller parameters to the damping controller parameters ($K_c,T_w,T_1,T_2,T_3,T_4$) that obtained from the oscillation control strategy that are matched to the real time power system oscillation mode $\lambda'$; and linking the power storage stations and the damping controller with updated damping controller parameters, to suppress the power system oscillations.

In an embodiment, the ow-carbon power system based on energy storage power stations adopts KUNDUR model. The ow-carbon power system based on energy storage power stations includes four generators, and the generators are considered as energy storage power stations, and the generators have functions such as peak regulating, new energy consuming, and stability controlling. The mathematical model adopts a six order synchronous generator model.

The relationship between the damping controller and the low-carbon power system with energy storage power stations is as follow:

the power system oscillation suppression model consists of the low-carbon power system with energy storage power stations and the damping controller; the damping controller adopts the output variables of the low-carbon power system with energy storage power stations as the input variables; and the output variables of the damping controller is the treated as the input variables of the low-carbon power system with energy storage power stations; and a transmission delay exists in the transmission process of output variables of the ow-carbon power system with energy storage power stations.

According to a participation degree of the state variables in power system oscillation modes of the power system oscillation suppression model, determining energy storage stations strongly related to to be suppressed power system oscillation modes.

Applying the technical solution of this embodiment to practical applications and obtaining calculation results of the participation factor, and the calculation results of the participation factor are as follows:

① the participation factor in oscillation mode 1 is $-0.12687\pm j3.1157$, and the max participation factor 0.19126, and the corresponding state variable is the rotation speed of the energy storage station 3, and the energy storage stations strongly related to the to be suppressed power system oscillation mode 1 is energy storage station 3;

② the participation factor in oscillation mode 1 is $-0.52003\pm j6.1695$, and the max participation factor 0.25611, and the corresponding state variable is the rotation speed of the energy storage station 4, and the energy storage stations strongly related to the to be suppressed power system oscillation mode 2 is energy storage station 4;

the participation factor in oscillation mode 3 is $-0.51083\pm j5.9943$, and the max participation factor 0.2498, and the corresponding state variable is the rotation speed of the energy storage station 2, and the energy storage stations strongly related to the to be suppressed power system oscillation modes 3 is energy storage station 2.

The oscillation mode 1 is interval low-frequency power oscillation, and the state variable of energy storage station 1 has a large participation factor to the oscillation mode 1. In order to improve controlling effect, the the state variable of energy storage station 1 is also considered, and the input signal of the damping controller is a speed difference between the energy storage station 1 and energy storage station 3.

Thus, constructing the correlation table of the oscillation modes vs the energy storage stations with three columns: ($-0.12687\pm j3.1157$, the energy storage station 1 and energy storage station 3), ($-0.52003\pm j6.1695$, the energy storage station 4), and ($-0.51083\pm j5.9943$, the energy storage station 2).

When the real time power system oscillation mode corresponds to the oscillation mode 1, to obtain the follow damping controller parameters based on the the correlation table of the damping controller parameters, the delay margin and the damping ratio:

$(K_c,T_w,T_1,T_2,T_3,T_4,\xi_i)=(10,5,0.324,0.212,0.324,0.212, 0.256,0.2196)$, $(K_c,T_w,T_1,T_2,T_3,T_4,\xi_i)=(15,5,0.324,0.212,0.324,0.212, 0.140,0.2427)$, $(K_c,T_w,T_1,T_2,T_3,T_4,\xi_i)=(20,5,0.324,0.212,0.324,0.212, 0.105,0.2431)$.

When the given delay margin $\tau_0$ set as 0.25 and given damping ratio $\xi_0$ set as 0.2, the delay margin $\tau$ is greater than the given delay margin $\tau_0$, and the damping ratio $\xi_i$ of is greater than or equal to the given damping ratio $\xi_0$, and the damping controller parameters ($K_c,T_w, T_1,T_2,T_3,T_4$)=(10,5, 0.324,0.212,0.324,0.212) is set as damping controller parameters.

In another embodiment, adopts the energy storage station 1 and energy storage station 3, and ($K_c,T_w, T_1, T_2,T_3,T_4$)= (10,5,0.324,0.212,0.324,0.212) is set as the damping controller parameters, and the the low-carbon power system can remain stable if the damping ratio is greater than or equal to the given damping ratio $\xi_0$ of 0.2, and the low-carbon power system can still remain stable even if the input signals transmission delay of the damping controller is less than or equal to the given delay margin $\tau_0$ of 0.25. And when the input signals transmission delay of the damping controller is 0.1s, 0.2s and 0.256s, the low-carbon power system needs more time to return to stability.

Figure 6:
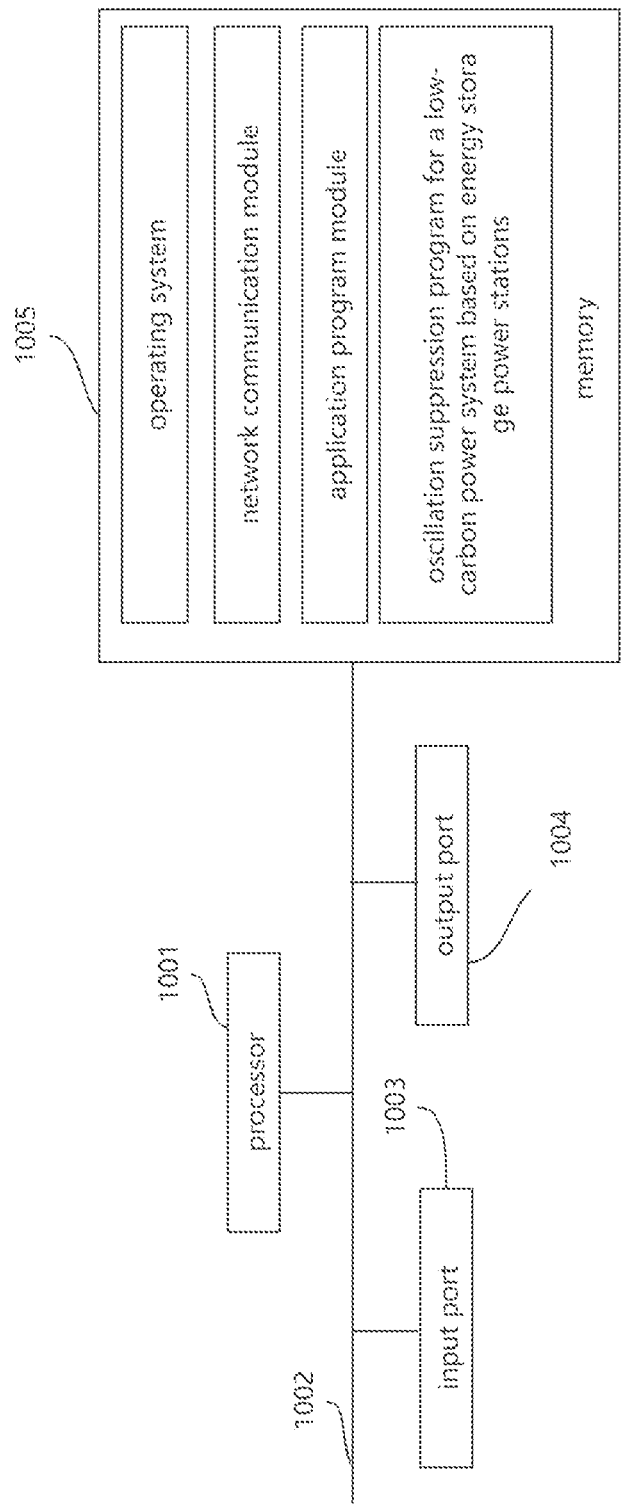
FIG. 6 is a structure diagram of an oscillation suppression method in the present disclosure.

As shown in FIG. 6, the oscillation suppression equipment includes: a processor 1001 (such as Central Processing Unit, CPU), a communication bus 1002, an input port 1003, an output port 1004, and a memory 1005. Among them, the communication bus 1002 is used to achieve connection communication between these components; the input port 1003 is used for data input; and the output port 1004 is used for data output, and the memory 1005 can be high-speed RAM memory or non volatile memory, such as disk memory, non-transitory computer-readable storage medium. Optionally, memory 1005 is a storage device independent of the aforementioned processor 1001.

The memory 1005, as a readable storage medium, may include an operating system, network communication module, application program module, and an oscillation suppression program for a low-carbon power system based on energy storage power stations. The network communication module is mainly used to connect to servers and communicate data with them; And processor 1001 is used to call the oscillation suppression program for a low-carbon power system based on energy storage power stations stored in memory 1005, and execute all steps of the oscillation suppression method for a low-carbon power system based on energy storage power stations mentioned above.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. An oscillation suppression method for a low-carbon power system based on energy storage power stations, wherein, comprising following steps of:
   step 1, constructing a power system oscillation suppression model based on an low-carbon power system model with energy storage power stations and a damping controller model;
   where, step 1 comprises following steps of:
   step 1-1, describing the low-carbon power system model with energy storage power stations as follows:

$$\begin{cases} \dfrac{dx_o(t)}{dt} = f(x_o(t), w_o(t), u_o(t)) \\ 0 = g(x_o(t), w_o(t), u_o(t)) \\ y_o(t) = o(x_o(t), w_o(t), u_o(t)) \end{cases},$$

where, t is time, $x_0(t), w_0(t), u_0(t)$ and $y_0(t)$ are state variables, algebraic variables, input variables and output variables of the low-carbon power system, respectively, and $dx_0(t)/dt$ is a derivative of the state variables over time t of the low-carbon power system, and $f(x_0(t), w_0(t), u_0(t))$ is a dynamic function relationship of the low-carbon power system, where $f(x_0(t), w_0(t), u_0(t))$ is consisted of dynamic equations of a generator, an exciter, and a governor component in the low-carbon power system, and a generator dynamic equation of the of the low-carbon power system is consisted of a conventional power station generator dynamic equation and an energy storage power stations generator dynamic equation, and
$g(x_0(t), w_0(t), u_0(t))$ is a algebraic function relation of the low-carbon power system, is composed of an tidal current equation in the low-carbon power system, and $o(x_0(t), w_0(t), u_0(t))$ is an output function relationship of the low-carbon power system, is decided by input signals and output signals of a damping controller;
linearizing the low-carbon power system model with energy storage station at a power system balance point to obtain a linearized low-carbon power system model with energy storage station:

$$\begin{cases} \dfrac{d\Delta x_o(t)}{dt} = A_o \Delta x_o(t) + B_o u_o(t) \\ y_o(t) = C_o \Delta x_o(t) \end{cases},$$

where, $\Delta x_0(t)$ is state variables increments of the low-carbon power system, $A_0$, $B_0$ and $C_0$ are a state matrix, an input matrix and an output matrix of the low-carbon power system, respectively;
step 1-2, describing the transfer function model of the damping controller as:

$$y_c(s) = K_c \dfrac{sT_w}{1+sT_w}\left(\dfrac{1+sT_1}{1+sT_2}\right)\left(\dfrac{1+sT_3}{1+sT_4}\right)u_c(s),$$

where, $y_c(s)$ is a Laplace transform value of the output signals of the damping controller, $u_c(s)$ is a Laplace transform value of the input signals of the damping controller, and $K_c$ is a damping controller gain, and $T_w$ is a time constant in a reset process of the damping controller during a process of a reset process, and s is a complex frequency of the Laplace transform, and $T_1, T_2, T_3$ and $T_4$ are the time constants in an advanced stage or a delay stage of the damping controller, respectively;
transforming the transfer function model of the damping controller into a state space form to obtain a state space model of the damping controller:

$$\begin{cases} \dfrac{dx_c(t)}{dt} = A_c x_c(t) + B_c u_c(t) \\ y_c(t) = C_c x_c(t) + D_c u_c(t) \end{cases},$$

where, $x_c(t)$ is state variables of the damping controller, $u_c(t)$ is input variables of the damping controller, and $y_c(t)$ is output variables of the damping controller, and $d_x c(t)/dt$ is derivatives of the state variables of the damping controller over time t, and $A_c, B_c, C_c$ and $D_c$ are a state matrix, an input matrix, an output matrix and a feed forward matrix of the damping controller, respectively;
step 1-3, obtaining a connection model between an input-output of the low-carbon power system with energy storage power stations and an input-output of the damping controller, based on a connection relationship between the low-carbon power system with the energy storage power stations and the damping controller:

$$\begin{cases} u_c(t) = y_o(t - h(t)) \\ u_o(t) = y_c(t) \end{cases},$$

where, h(t) is an output signals transmission delay of the low-carbon power system with the energy storage power stations, and h(t) satisfies an equation of:

$$\begin{cases} h(t) \le \tau \\ \dfrac{dh(t)}{dt} \le \mu \end{cases},$$

where, $\tau$ is a delay margin, where $\tau$ is an upper limit of output signals transmission delay of the low-carbon power system with energy storage power stations, and dh(t)/dt is change rates of the output signals transmission delay of the low-carbon power system with the energy storage power stations, and μ is an upper limit of the change rates of the output signals transmission delay of the low-carbon power system with the energy storage power stations;
combining the linearized low-carbon power system model with energy storage power stations and the state space model of the damping controller, to obtain the power system oscillation suppression model:

$$\dfrac{dx(t)}{dt} = Ax(t) + A_d x(t - h(t)),$$

$$x(t) = [\Delta x_o(t) \quad x_c(t)]^T,$$

-continued $$A = \begin{bmatrix} A_o & B_o C_c \\ 0 & A_c \end{bmatrix},$$

$$A_d = \begin{bmatrix} B_o D_c C_o & 0 \\ B_c C_o & 0 \end{bmatrix},$$

where, x(t) is state variables of the power system oscillation suppression model, x(t) is consisted of the state variables increments $\Delta x_0(t)$ and the state variables of the damping controller $x_c(t)$, and A is a state matrix of the power system oscillation suppression model, and $A_d$ is a time delay matrix of the power system oscillation suppression model;

step 2, according to a participation degree of the state variables in power system oscillation modes of the power system oscillation suppression model, determining energy storage stations strongly related to to be suppressed power system oscillation modes, and constructing a correlation table of the oscillation modes vs the energy storage stations;

step 2-1, adopting a participation factor matrix to describe the participation degree of the state variables in the power system oscillation modes;

describing the participation factor matrix P as follow:

$$P = [P_1, P_2, \ldots, P_i, \ldots, P_n]$$

where, $P_i$ is a i-th column vector of the factor matrix P:

$$P_i = \begin{bmatrix} \phi_{1i}\psi_{i1} \\ \phi_{2i}\psi_{i2} \\ \vdots \\ \phi_{ki}\psi_{ik} \\ \vdots \\ \phi_{ni}\psi_{in} \end{bmatrix},$$

where, i is an i-th column vector of the state matrix of the oscillation suppression model A and the time delay matrix of the oscillation suppression model $A_d$ (hereinafter matrix $A+A_d$), and n is a number of eigenvalues of the matrix $A+A_d$, and k is a number of the k-th state variables of the state variables of the power system oscillation suppression model, and a value range of k is 1,2, ... ,n;

determining $P_i$, and $P_i$ is a i-th column vector of the factor matrix P, by performing a calculation for eigenvalues, right eigenvectors, left eigenvectors of the matrix $A+A_d$;

adopting $\phi_{ki}$ indicates the participation degree of a k-th state variable in an i-th eigenvalue, $\psi_{ik}$ is a k-th element of an i-th right eigenvector $\phi_i$ of the matrix $A+A_d$;

calculating the i-th right eigenvector $\phi_i$ by a following equation:

$$(A+A_d)\phi_i = \lambda_i \phi_i,$$

where, $\lambda_i$ is a i-th eigenvalue of the matrix $A+A_d$, $\psi_{ik}$ is a contribution degree of the k-th state variable to the i-th eigenvalue of the matrix $A+A_d$, and $\psi_{ik}$ is a k-th element of an i-th left eigenvector of the matrix $A+A_d$;

calculating $\psi_i$ by the following equation:

$$\psi_i(A+A_d) = \psi_i \lambda_i;$$

step 2-2, determining the to be suppressed power system oscillation modes $\lambda$ and the energy storage stations strongly related to the to be suppressed power system oscillation modes $\lambda$ based on $\lambda_i$, $\lambda_i$ is the i-th eigenvalue of the matrix $A+A_d$;

where, $\lambda_i$, the i-th eigenvalue of the matrix $A+A_d$, is a complex number, describing $\lambda_i$ with a complex form:

$$\lambda_i = \sigma_i \pm j\omega_i,$$

where, $\sigma_i \pm j\omega_i$ is a real part, $\omega_i$ is a virtual part, and j is a symbol of the virtual part;

calculating a damping ratio $\xi_i$ of the i-th eigenvalue of the matrix $A+A_d$ as follow:

$$\xi_i = \frac{-\sigma_i}{\sqrt{\sigma_i^2 + \omega_i^2}},$$

if $\sigma_i$ is greater than a given damping factor $\sigma_0$, or $\xi_i$ is greater than a given damping ratio $\xi_0$, and oscillation modes corresponding to $\lambda_i$ can be suppressed automatically, and oscillation modes corresponding to $\lambda_i$ is not treated as the to be suppressed power system oscillation modes;

if $\sigma_i$ is less than the given damping factor $\sigma_0$, or $\xi_i$ is less than the given damping ratio $\xi_0$, and oscillation modes corresponding to $\lambda_i$ is treated as the to be suppressed power system oscillation modes $\lambda$;

when a k'-th state variable meets both of the following conditions:

$$\phi_{k'i}\psi_{ik'} = \max\{\phi_{1i}\psi_{i1}, \phi_{2i}\psi_{i2}, \ldots, \phi_{ki}\psi_{ik}, \ldots, \phi_{ni}\psi_{in}\}, \quad \text{condition 1:}$$

condition 2: the k'-th state variable belongs to the state variables of the energy storage power stations, selecting corresponding energy storage power stations of a k'-th state variable as target energy storage power stations to suppress power system oscillations, where $\max\{\phi_{1i}\psi_{i1}, \phi_{2i}\psi_{i2}, \ldots, \phi_{ki}\psi_{ik}, \ldots, \phi_{ni}\psi_{in}\}$ is a maximum value function;

step 2-3, constructing a correlation table of the oscillation modes vs the energy storage stations based on a mapping relationship between the oscillation modes and the energy storage power stations;

defining the mapping relationship between the to be suppressed power system oscillation modes and the corresponding energy storage stations of the k'-th state variable as:

mapping 1: the to be suppressed power system oscillation modes $\lambda \Rightarrow$ the corresponding energy storage stations of the k'-th state variable, where, $\Rightarrow$ is a mapping relationship symbol;

obtaining the following elements according to mapping 1:

(the to be suppressed power system oscillation modes $\lambda$, the corresponding energy storage stations of the k'-th state variable), taking (the to be suppressed power system oscillation modes $\lambda$, the corresponding energy storage stations of the k'-th state variable) as a line in the correlation table of the oscillation modes vs the energy storage stations, as the matrix $A+A_d$ has n eigenvalues, for the i-th eigenvalue of the matrix $A+A_d$, when a value of the i is took from 1 to n, thus obtaining the correlation table of the oscillation modes vs the energy storage stations with multiple lines;

step 3, for the energy storage power stations strongly related to the to be suppressed power system oscillation modes, adopting a time-dependent stability condition to construct a correlation table among the damping controller parameters, a delay margin and a damping ratio;

step 3-1, adopting the time delay-dependent stability condition to calculate the delay margin i, and calculating the damping ratio $\xi_i$ according to the matrix $A+A_d$, based on the power system oscillation suppression model $dx(t)/dt=Ax(t)+A_dx(t-h(t))$;

where, the time-dependent stability conditions are as follows:

giving the delay margin $\tau$ and the upper limit of the change rates of the output signals transmission delay of the low-carbon power system $\mu$, if undecided matrices $M_1=M_1^T>0$, $M_2=M_2^T>0$, $M_3=M_3^T>0$, $$M = \begin{bmatrix} M_{11} & M_{12} \\ M_{12}^T & M_{22} \end{bmatrix} \geq 0$$

and appropriate dimensional matrices $N_1$ and $N_2$ existed to make the following linear matrix inequalities hold:

$$\begin{bmatrix} M_{11} & M_{12} & N_1 \\ M_{12}^T & M_{22} & N_2 \\ N_1^T & N_2^T & M_3 \end{bmatrix} \geq 0, \begin{bmatrix} \Gamma_{11} & \Gamma_{12} & \tau A^T M_3 \\ \Gamma_{12}^T & \Gamma_{22} & \tau A_d^T M_3 \\ \tau M_3^T A & \tau M_3^T A_d & -\tau M_3 \end{bmatrix} < 0,$$

where, $$\Gamma_{11} = M_1 A + A^T M_1 + N_1 + N_1^T + M_2 + \tau M_{11},$$
$$\Gamma_{12} = M_1 A_d - N_1 + N_2^T + \tau M_{12},$$
$$\Gamma_{22} = -N_2 - N_2^T - (1-\mu)M_2 + \tau M_{22},$$

thus, determining the power system oscillation suppression model $dx(t)/dt=Ax(t)+A_dx(t-h(t))$ in a stable state;

as the state matrix A and the time delay matrix $A_d$ of the power system oscillation suppression model are varied over the state matrix $A_c$, input matrix $B_c$, output matrix $C_c$, and feed forward matrix $D_c$ of the damping controller, and a result of the delay margin $\tau$ is corresponded to damping controller parameters ($K_c$, $T_W$, $T_1$, $T_2$, $T_3$, $T_4$), and the damping ratio $\xi_i$ that calculated by the matrix A+ is corresponded to the damping controller parameters ($K_c$, $T_w$, $T_1$, $T_2$, $T_3$, $T_4$);

step 3-2, constructing the mapping relationship among the damping controller parameters, the delay margin and the damping ratio;

defining a mapping relationship of mapping 2 among the damping controller parameters, the delay margin $\tau$ and the damping ratio $\xi_i$ as:

$$(K_c,T_w,T_1,T_2,T_3,T_4) \Rightarrow (\tau,\xi_i), \quad \text{mapping\_2:}$$

obtaining the following elements according to the mapping 2: ($K_c$, $T_w$, $T_1$, $T_2$, $T_3$, $T_4$, $\tau$, $\xi_i$), taking ($K_c$,$T_w$,$T_1$,$T_2$,$T_3$,$T_4$,$\tau$, $\xi_i$) as a line in the correlation table of the damping controller parameters, the delay margin and the damping ratio;

step 3-3, constructing a correlation table of the damping controller parameters, the delay margin and the damping ratio based on the mapping relationship among the damping controller parameters, the delay margin and the damping ratio;

adjusting the values of the damping controller parameters ($K_c$,$T_w$, $T_1$, $T_2$,$T_3$,$T_4$), to obtain the transfer function model of the damping controller and the state space model of the damping controller which are corresponded to the values of the damping controller parameters ($K_c$, $T_w$, $T_1$, $T_2$, $T_3$, $T_4$), and to obtain the values of $A_c$,$B_c$,$C_c$ and $D_c$ which are corresponded to the state space model of the damping controller, and to obtain the state matrix A and time delay matrix $A_d$ which are corresponded to the values of the damping controller parameters ($K_c$,$T_w$,$T_1$, $T_2$, $T_3$,$T_4$), and adopting a time delay-dependent stability condition and a formula of the damping ratio to obtain the delay margin $\tau$ and the damping ratio $\xi_i$ based on the state matrix A and time delay matrix $A_d$, where, the delay margin $\tau$ and the damping ratio $\xi_i$ are corresponded to the values of the damping controller parameters ($K_c$,$T_w$,$T_1$,$T_2$,$T_3$,$T_4$), respectively, describing a derivation and a calculation process as follows:

$$(K_c,T_w,T_1,T_2,T_3,T_4) \rightarrow (A_c,B_c,C_c,D_c) \rightarrow (A,A_d) \rightarrow (\tau,\xi_i),$$

where, $\rightarrow$ is a derivation symbol;

obtaining multiple mapping 2 elements ($K_c$,$T_w$, $T_1$, $T_2$, $T_3$,$T_4$,$\tau$, $\xi_i$), when there are multiple values of the damping controller parameters ($K_c$, $T_w$,$T_1$, $T_2$, $T_3$,$T_4$);

adopting the multiple mapping 2 elements as multiple lines in the correlation table of the damping controller parameters, the delay margin and the damping ratio, and forming the correlation table of the damping controller parameters, the delay margin and the damping ratio;

step 4, constructing an oscillatory control strategy knowledge base that based on the energy storage power stations, based on the correlation table of the oscillation modes vs the energy storage stations and the correlation table of the damping controller parameters, the delay margin and the damping ratio;

where, the oscillatory control strategy knowledge base that based on the energy storage power stations is consisted of two parts, one part is the correlation table of the oscillation modes vs the energy storage stations, and another part is the correlation table of the damping controller parameters, the delay margin and the damping ratio;

a searching process of the oscillatory control strategy knowledge base that based on the energy storage power stations is as follows:

giving the to be suppressed power system oscillation modes $\lambda$;

obtaining the energy storage power stations strongly related to the to be suppressed power system oscillation modes based on correlation table of the oscillation modes vs the energy storage stations, that is, the energy storage power stations strongly related to the to be suppressed power system oscillation modes are the corresponding energy storage stations of the k'-th state variable;

obtaining the damping controller parameters ($K_c$, $T_w$, $T_1$, $T_2$, $T_3$, $T_4$) that are corresponded to the delay margin $\tau$ and the damping ratio $\xi_i$ based on the correlation table of the damping controller parameters, the delay margin and the damping ratio;

where, the damping controller parameters ($K_c$, $T_w$, $T_1$, $T_2$, $T_3$, $T_4$) are met the damping performance requirements of the delay margin $\tau$ and the damping ratio $\xi_i$;

step 5, based on a real time power system oscillation mode, searching for a matching oscillation mode and a oscillation control strategy from the oscillatory control strategy knowledge base that based on the energy storage power stations;

step 5-1, in the oscillation control strategy knowledge base that based on the energy storage power stations, comparing the real time power system oscillation mode λ' with the to be suppressed power system oscillation modes λ, and if, $$\lambda' \in \eta(\lambda, \rho):$$

determining the real time power system oscillation mode λ' needs to be suppressed, where $\eta(\lambda,\rho)$ is a circular neighborhood with a center λ and a radius ρ;

step 5-2, in the oscillation control strategy knowledge base that based on the energy storage power stations, according to the to be suppressed power system oscillation modes λ, obtaining the energy storage power stations strongly related to the to be suppressed power system oscillation modes λ, based on correlation table of the oscillation modes vs the energy storage stations, that is, to obtain the corresponding energy storage power stations of the k'-th state variable;

step 5-3, in the oscillation control strategy knowledge base that based on the energy storage power stations, with the corresponding energy storage power stations of the k'-th state variable and the correlation table of the damping controller parameters, the delay margin and the damping ratio, determining the damping controller parameters ($K_c, T_w, T_1, T_2, T_3, T_4$) by following solutions:

solution 1: if only a given delay margin $\tau_0$ is set, selecting the damping controller parameters which are corresponded to the delay margin i as damping controller parameters ($K_c, T_w, T_1, T_2, T_3, T_4$) to be set, where the delay margin τ is greater than the given delay margin $\tau_0$;

under a condition of solution 1, once the damping controller to be set adopts the damping controller parameters ($K_c, T_w, T_1, T_2, T_3, T_4$), the low-carbon power system can remain stable even if the input signals transmission delay of the damping controller is less than or equal to the given delay margin $\tau_0$; and solution 2: if only a given damping ratio $\xi_0$ is set, selecting the damping controller parameters ($K_c, T_w, T_1, T_2, T_3, T_4$) which are corresponded to the damping ratio $\xi_i$ as a damping controller parameters to be set, and the damping ratio $\xi_i$ is greater than the given damping ratio $\xi_0$;

under a condition of solution 2, once the damping controller to be set adopts the damping controller parameters ($K_c, T_w, T_1, T_2, T_3, T_4$), the low-carbon power system can remain stable even if the damping ratio is greater than or equal to the given damping ratio $\xi_0$; and solution 3: if the given delay margin $\tau_0$ and the given damping ratio $\xi_0$ are set, selecting the damping controller parameters ($K_c, T_w, T_1, T_2, T_3, T_4$) which are corresponded to the delay margin τ and the damping ratio $\xi_i$ as a damping controller parameters to be set, where the delay margin τ is greater than the given delay margin $\tau_0$ and the damping ratio $\xi_i$ is greater than the given damping ratio $\xi_0$;

under a condition of solution 3, once the damping controller to be set adopts the damping controller parameters ($K_c, T_w, T_1, T_2, T_3, T_4$), the low-carbon power system can remain stable even if the damping ratio $\xi_i$ is greater than or equal to the given damping ratio $\xi_0$, and the low-carbon power system can still remain stable even if the input signals transmission delay of the damping controller is less than or equal to the given delay margin $\tau_0$;

searching in the oscillation control strategy knowledge base that based on the energy storage power stations, to obtain the energy storage power stations strongly related to the to be suppressed power system oscillation modes A and the damping controller parameters ($K_c, T_w, T_1, T_2, T_3, T_4$), and to obtain a oscillation control strategy that is matched to the real time power system oscillation mode λ', and the oscillation control strategy is a decision basis for the power dispatching mechanism to suppress the power system oscillations;

step 6, suppressing the power system oscillations based on the oscillation control strategy that is matched to the real time power system oscillation mode λ'; and obtaining the energy storage power stations strongly related to the to be suppressed power system oscillation modes and the damping controller parameters ($K_c, T_w, T_1, T_2, T_3, T_4$) based on the oscillation control strategy that is matched to the real time power system oscillation mode λ'; and updating current damping controller parameters to the damping controller parameters ($K_c, T_w, T_1, T_2, T_3, T_4$) that obtained from the oscillation control strategy that are matched to the real time power system oscillation mode λ'; and linking the power storage stations and the damping controller with updated damping controller parameters, to suppress the power system oscillations.

2. The oscillation suppression method for a low-carbon power system based on energy storage power stations according to claim 1, wherein, in step 1-1, the energy storage power stations generator dynamic equation is a synchronous generator model or a virtual synchronous generator model.

3. The oscillation suppression method for a low-carbon power system based on energy storage power stations according to claim 2, wherein, in step 1-1, when the energy storage power stations generator dynamic equation is the virtual synchronous generator model:

$$\begin{cases} J_v \dot{\omega}_v = P_v^* - P_v + D_p(\omega_v - \omega_v^*) \\ K_v \dot{E}_v = Q_v^* - Q_v + D_q(U_v^* - U_v), \\ \dot{\theta}_v = \omega_v \end{cases}$$

where, $\omega_v$, $\omega^*_v$, $\dot{a}_v$ are a power grid angle velocity, a reference value of the power grid angle velocity, and a derivative of the power grid angle velocity at an access point of the energy storage power stations, respectively, and $P_v$ and $Q_v$ are an active power and a reactive power of the output of a virtual synchronous generator, respectively; and $P_v^*$ and $Q_v^*$ are a reference value of the active power and a reference value of the reactive power reactive power that output by the virtual synchronous generator, respectively; and $J_v$ and $K_v$ are a virtual moment of inertia and a virtual excitation regulation inertia coefficient of the virtual synchronous generator, respectively; and $D_P$ and $D_q$ are a damping coefficient and a reactive-voltage droop coefficient of the virtual synchronous generator, respectively; and $U_v$ and $U^*_v$ are a grid voltage and a reference value of grid voltage at the access point of the energy storage power stations; and $E_v$ and $\theta_v$ are an amplitude and a phase of the virtual synchronous generator, respectively; and $\dot{E}_v$ and $\dot{\theta}_v$ are a derivative of the amplitude and a derivative of phase of the virtual synchronous generator, respectively.

4. The oscillation suppression method for a low-carbon power system based on energy storage power stations according to claim 1, wherein, in step 3-1, the delay margin is calculated by Matlab, and the upper limit of the change rates of the output signals transmission delay µ of the low-carbon power system is given based on a max change rate of an output signals transmission delay between a collecting point of the output signals transmission of the low-carbon power system and the damping controller.

5. The oscillation suppression method for a low-carbon power system based on energy storage power stations according to claim 4, wherein, in step 3-1, a value range of the upper limit of the change rates of the output signals transmission delay µ of the low-carbon power system is 0 to 1.

6. The oscillation suppression method for a low-carbon power system based on energy storage power stations according to claim 1, wherein, in step 5-1, a value of the radius ρ is 0.01.

\* \* \* \* \*